United States Patent [19]
Ehrlich

[11] Patent Number: 5,439,266
[45] Date of Patent: Aug. 8, 1995

[54] RIVETED PLATE TRAILER CONSTRUCTION

[75] Inventor: Rodney P. Ehrlich, Monticello, Ind.

[73] Assignee: Wabash National Corporation, Lafayette, Ind.

[21] Appl. No.: 136,569

[22] Filed: Oct. 13, 1993

[51] Int. Cl.⁶ .............................................. B62D 33/04
[52] U.S. Cl. .................................. 296/181; 411/501; 411/504; 29/525.2; 52/418; 52/765
[58] Field of Search ................. 296/181; 411/501, 504, 411/506, 505, 507; 52/418, 765, 459; 29/525.2

[56] References Cited

U.S. PATENT DOCUMENTS

| | | | |
|---|---|---|---|
| 3,359,847 | 12/1967 | Richmond | 411/506 |
| 4,810,027 | 3/1989 | Ehrlich | 296/181 |
| 4,904,137 | 2/1990 | Matuschek | 411/501 |

FOREIGN PATENT DOCUMENTS 0393658  8/1908  France .................................. 411/504

OTHER PUBLICATIONS

Standard Handbook for Mechanical Engineers, 1967 pp. 8–43.

Primary Examiner—David M. Mitchell
Assistant Examiner—Kia M. Robinson
Attorney, Agent, or Firm—Trexler, Bushnell, Giangiorgi & Blackstone, Ltd.

[57] ABSTRACT

A riveted sidewall structure for a trailer body comprising a pair of upstanding side plate members and upstanding post members covering adjacent edges of the plate member. Rivets extend through aligned apertures in the plate members and the post member. The rivets have conical heads with an included angle for swaging the wall of the hole in the member through which the head extends for ensuring complete filling of the hole substantially at the sheer plane between the members.

13 Claims, 1 Drawing Sheet

RIVETED PLATE TRAILER CONSTRUCTION

BACKGROUND OF THE INVENTION

The present invention relates to a plate trailer body, and more particularly to a riveted structure for a plate trailer body.

Plate trailers of the general type contemplated herein have been disclosed in U.S. Pat. Nos. 4,685,721 and 4,810,027. Such trailer bodies include a plurality of relatively thick plates, preferably made of aluminum, disposed in side-by-side relationship and riveted to extruded aluminum posts. While certain of such prior plate trailer constructions have been very successful, problems have sometimes been encountered as a result of loosening of some rivets sufficiently to permit leakage of rain water and the like.

SUMMARY OF THE INVENTION

It is a primary object of the present invention to provide a novel riveted plate trailer body constructed so as to substantially overcome any problem of leakage of rivet joints as a result of loosening.

A more specific object of the present invention is to provide a novel riveted plate trailer body construction of the above-described type, wherein a rivet completely fills holes through a plate member and adjoining post member, particularly at a sheer plane, between such members so as to minimize any possibility of loosening of the rivet which might cause leakage.

Other objects and advantages of the present invention will become apparent from the following description and the accompanying drawings.

A plate trailer body incorporating features of the present invention includes at least a pair of upstanding relatively thick aluminum side plates disposed with substantially abutting edges and an extruded aluminum post covering said edges. Aligned holes are punched through the plate members and the post member for receiving rivets. The hole through one of such members is swaged to provide a conical configuration for receiving a similarly shaped head of a rivet. The included angle of such conical configuration is such that when the material of the plate around the hole is swaged or forged, the material tends to extrude outwardly toward the outer surface of the member for slightly increasing the thickness Of the member without interfering with the complementary member of the joint.

DETAILED DESCRIPTION OF A PREFERRED EMBODIMENT

Figure 1:
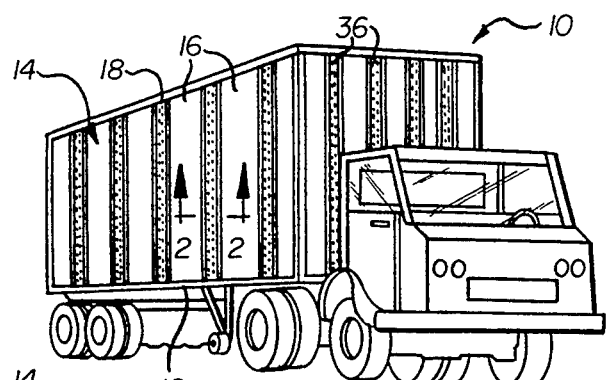
FIG. 1 is a simplified perspective view showing a plate trailer body incorporating features of the present invention.

Referring now more specifically to the drawings, wherein like parts are designated by the same numerals throughout the various figures, a plate trailer body 10 incorporating features of the present invention is shown in FIG. 1. The body includes a floor 12 from which upstanding sidewalls 14 extend. Each of the sidewalls comprises a plurality of plates 16 joined together by upstanding posts 18 in the manner to be described below. While the body 10 is disclosed herein as being mounted on wheels, in the manner of a conventional truck trailer, it is to be understood that features of the present invention may be incorporated not only in trailer bodies, but also in bodies commonly called containers used for shipping goods by any of the usual means, such as by boat, train, or truck. Thus, the term "trailer body" as used herein is intended to cover containers, as well as truck trailer bodies.

Figure 2:
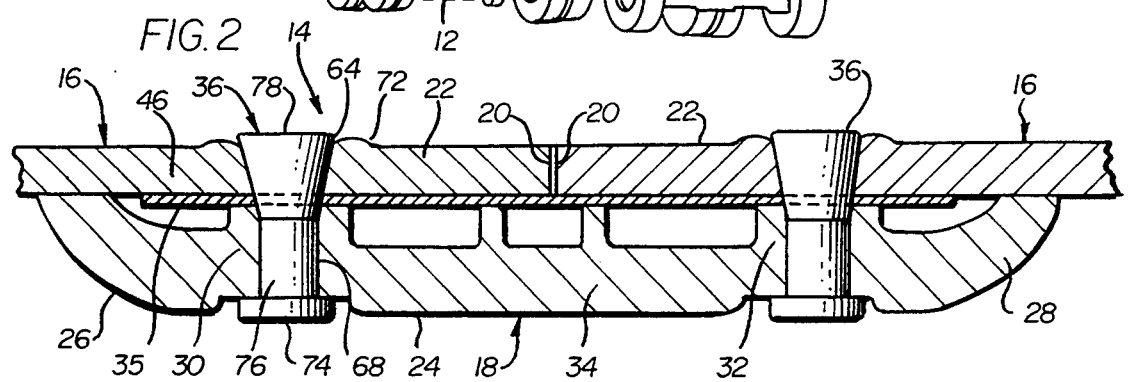
FIG. 2 is an enlarged fragmentary partial sectional view taken along line 2—2 in FIG. 1.
Figure 3:
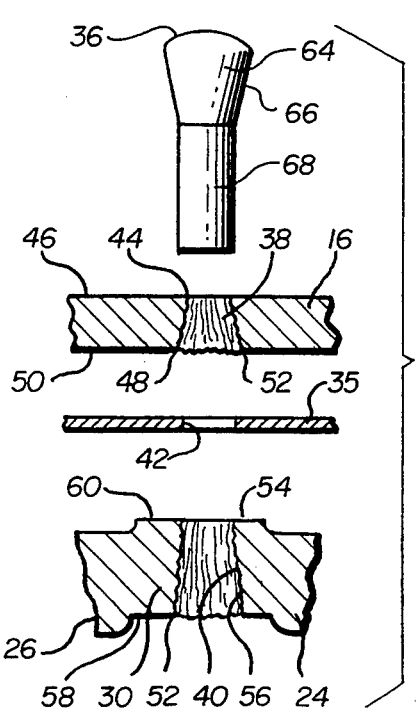
FIG. 3 is an exploded fragmentary partial sectional view of a rivet, plate member, and post member prior to assembly in accordance with features of the present invention.

The manner of joining adjacent side panel members 16 in accordance with the present invention is shown in detail in FIGS. 2 and 3. More specifically, the panel members are disposed so that adjacent edges 20 thereof are located in substantially abutting relationship. The post structure 18 covers these edges and marginal portions 22 of the panel members. The upstanding side post 18 is wide enough to cover the edges 20 and marginal portions 22 of the plate members 16. Preferably, the side post 18 is constructed in a manner similar to or the same as the corresponding side post structure disclosed in the above-mentioned U.S. Pat. No. 4,810,027. It suffices to state here that the side post comprises an extruded aluminum member 24 having curved marginal flange portions 26 and 28 engagable with the plates 16, and abutment portions 30 and 32 joined by central bridge portion 34. A thin aluminum sheet shim or lap member 35 is disposed between the plates and the member 24 for providing the post with a box-like configuration. Rivets 36, preferably made of aluminum, extend through aligned apertures or holes in the plate members, the shim, and the abutment portions 30 and 32 of the post member 24 for securing the parts together in the manner described more in detail below. As indicated in FIG. 1, vertical series of the rivets and holes are provided in the plates and the post structures so that the parts are securely connected throughout their vertical height.

As shown in FIG. 3, aligned holes 38, 40, and 42 are punched through the plate 16, the abutment portion 30 of post member 24, and the shim or lap member 35. The plate member 16 is preferably formed from heavy gauge aluminum having a thickness of between about 0.100 inch and 0.200 inch. The post member 24 is extruded so that the abutment portion 30 thereof preferably has a thickness of twice the thickness of the plate member or, in other words, of between about 0.200 inch and about 0.400 inch. It has been found that when the hole 38 is punched in the heavy gauge plate 16, the hole has a first diameter at a point 44 at the outer surface 46 of the plate which corresponds substantially to the diameter of the tool or punch used to form the hole. However, as the punch progresses through the plate material, the material is sheared or torn in a manner which progressively increases the diameter of the hole. As a result, the hole has a diameter at point 48 at surface 50 opposite from the surface 46, which is greater than the diameter of the hole at point 44. In addition, jagged elements of flashing 52 usually are formed and project slightly beyond the surface 50. Because of the thinness of the shim 35', similar enlargement of the diameter of the hole 42 by the punch is minimal. However, the hole 40 through the abutment portion 30 of the relatively thick post member is similar to the hole 38, in that it has a first diameter at point 54 similar to the predetermined diameter of the punch, and a larger diameter 56 at the surface 58 of the post member opposite from the inner surface 60 where the punch enters the part. Elements of flashing 62 may also be formed around the hole 40 at the diameter 56.

The rivet 36 includes a head portion 64 having a frustoconical work-engaging surface 66, which will be described in more detail below. An elongated shank 68 extends from the head portion 64 and has a diameter substantially equal to the diameter of the holes 38 and 40 at the points 44 and 54. The diameter of the shank 68 is also substantially equal to the diameter of the hole 42 through the shim 35.

Figure 5:
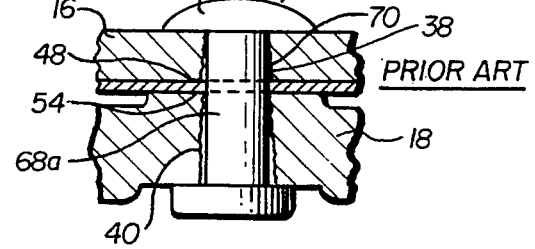
FIGS. 5 and 6 are fragmentary partial sectional views of alternative forms of prior art structures.
Figure 6:
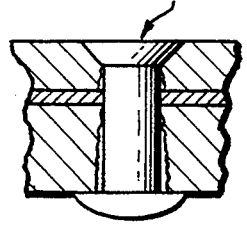

FIGS. 5 and 6 illustrate different conventional prior art rivets and assembly techniques which have been used to secure the plates and posts together. In these figures, the flaring of the holes 38 and 40 is somewhat exaggerated for the sake of clarity, and it is to be particularly noted that the diameter of hole 38 at point 48 is greater than the diameter of the rivet shank, and also greater than the diameter of the hole 40 at point 54. It has been found that when a rivet, such as the rivet 36a in FIG. 5 having a round head 64a, is used, the shank 68a will not be expanded so as to fill a gap 70 between the shank and the sidewall of the hole 38 substantially at the sheer plane between the plate member 16 and the post structure 18. The same is true when a rivet, such as 36b shown in FIG. 6, is used, which rivet has a conical head having a conventional included angle of about 76°. It has been found that with such prior art riveted constructions which do not completely fill the holes through the workpiece around the rivet shanks, particularly in the vicinity of the sheer plane between the connected part, flexing or working of the joint during normal use can cause sufficient loosening of the rivet to permit rain water and the like to leak through the joint.

In accordance with the present invention, the foregoing problems with the prior art are overcome by working the material of the plate member 16 around the hole 38 and shaping the head 64 of the rivet in a manner so as to ensure complete filling of the holes and aggressive intimate conforming of the material of the rivets and the plates and post members in sealing engagement. More specifically, the rivet 36 is heat-treated and hardened so that the aluminum material thereof is harder than the aluminum material of the plate 16, the post member 24, and the shim member 35. Furthermore, it is important to note that the conical surface 66 of the rivet head is formed so that the included angle thereof is between about 10° and about 45°, as distinguished from the 76° included angle of a conventional rivet, shown in FIG. 6. It has been found that with this structure of the rivet head, when the rivet is applied, the material of the plate member 16 surrounding the hole 38 is swaged or forged, so as to conform to the conical surface 66 of the rivet head. Furthermore, a portion of the cold worked material may be extruded outwardly of the surface 46 of the plate member, so as to form an annular bulge 72 around the rivet hole. Such cold working and increase in the thickness of the plate member at the rivet tends to add strength to the connection. The axial length of the rivet work-engaging conical surface 66 is at least substantially as great, and preferably slightly longer than the thickness of the plate member 16. As a result, the wall of the punched aperture 38 is cold-worked throughout its length, and the diameter thereof is increased throughout its length to at least equal to and preferably slightly exceed, the diameter of the punched hole at point 48 indicated in FIG. 3. Thus, the space or void 70 of the prior art structures indicated in FIGS. 5 and 6 is eliminated, and intimate contact between the rivet and the workpieces is assured, particularly at the sheer plane between plate member 16 and the post structure 18. It has been found that this structure minimizes working between the rivet and the other parts, so as to reduce any possibility of leakage. It has also been found that rivets having conical work-engaging surfaces with an included angle similar to the conventional 76° included angle will not perform the function of swaging and outwardly extruding the material of the plate member around the hole, and will not provide the advantages of the rivet 36.

When the parts are finally assembled, as shown in FIG. 2, the rivet 36 is inserted through the aligned holes 38, 40, and 42, and the free end of the shank 68 is forged and upset so as to provide an enlargement 74 cooperating with the head 64 for securing the parts together. At the same time, portions 76 of the shank 68 adjacent the enlargement 74 are expanded for completely filling the hole 40, and the head portion 64 serves to forge the wall of the aperture 38 in the manner described above. Furthermore, the relatively small included angle of the conical surface 66, as compared with conventional rivets, enables material of the head to be axially extruded inwardly, as indicated by the flat surface 78 at the end of the head 64 in FIG. 2, so as further to promote expansion of the rivet for completely filling the holes through the workpieces.

Figure 4:
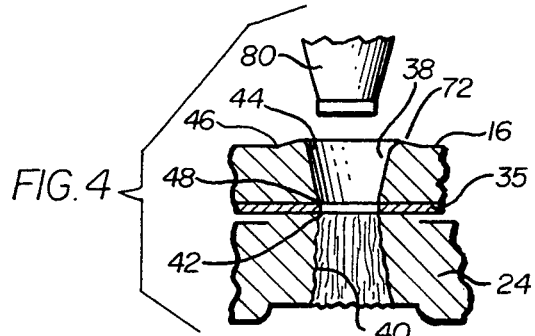
FIG. 4 is a fragmentary partial sectional view showing an alternative procedure for producing a structure incorporating features of the present invention.

FIG. 4 illustrates a modified procedure for obtaining the structure of the present invention. In this embodiment, a forging or swaging tool 80 is utilized for cold-working the punched hole 38 in the plate 16 sufficiently so that the diameter of the hole 38 at point 44 is greater than the diameter at point 48. Preferably, the included angle of the conical portion of the tool 80 is substantially the same as the included angle of the conical surface of the rivet described above, so that the material around the hole 38 is cold-worked and extruded rearwardly back toward the outer surface 46 in the manner described above.

While a preferred embodiment of the present invention has been shown and described herein, structural details may be changed without departing from the spirit and scope of the appended claims.

The invention is claimed as follows:

1. A trailer body comprising a floor and upstanding sides, said sides including a plurality of adjacent pairs of upstanding side plate members of predetermined thickness, said plate members having opposed edges, a plurality of side post members respectively covering said edges of adjacent pairs of plate members, each of said plate members and post members having a first surface and a second surface, said second surface of said plate members and said first surface of said post members being generally adjacent to each other, each of said plate members and post members having a series of aligned holes punched therethrough, said holes in said plate members initially having a first pre-determined diameter at said first surface thereof and a second larger diameter at said second surface thereof, said holes in said post members initially having a diameter at said first surface thereof less than said second diameter of said plate members second surface and a larger diameter at said second surface thereof, and rivets respectively extending through said aligned holes in said members for securing said members together, each of said rivets having a shank with a diameter initially substantially the same as said initial first diameter of said plate members, each of said rivets including a head with a substantially frustoconical member-engaging surface having an included angle for ensuring substantially completely filling at least a portion of said aligned holes substantially at a sheer plane between the members, and after assembly, an end of each rivet opposite from said head being upset and enlarged thereby enlarging the diameter of the shank of the rivet for finally completely filling a portion of the holes, surfaces of said holes in said plate members and said post members substantially finally conforming to said rivets after assembly of said rivets through said holes and upsetting of said rivet ends.

2. A trailer body, as defined in claim 1, wherein said post member is about twice as thick as said plate member, and said body further including a thin shim member between said plate members and said post members, and covering said edges of said plate members.

3. A trailer body, as defined in claim 2, wherein said plate member has a thickness of between about 0.100 inch and 0.200 inch, and said shim has a thickness of about 0.050 inch.

4. A trailer body, as defined in claim 1, wherein said plate, post, and shim members are aluminum, and said rivets are aluminum having a hardness greater than the hardness of said members for enabling the rivets to cold-work the members when the rivets are being upset.

5. A trailer body comprising an upstanding side, including a pair of upstanding side plate members having marginal portions of predetermined thickness and opposed edges, said marginal portions of the plate members having a first surface and a second surface, an upstanding post member having portions covering said edges of said plate members, said portions of said post member having a first surface and a second surface, said plate members having a series of holes punched through said marginal portions thereof, said post member having a series of holes punched through said portions thereof, and respectively aligned with the holes in said plate members, and rivets respectively extending through aligned holes in said portions of said plate members and said post member, said rivets respectively including a head disposed in a first hole in one of said plate member and post member portions, and a shank extending through a second aligned hole in the other of said plate member and post member portions, said first hole having a swaged conical surface tapering inwardly from the first surface to the second surface and toward the second hole with an included angle for causing material surrounding said first hole to be shaped during assembly of the rivet, said head intimately engaging and conforming to said swaged conical surface, and said shank, after assembly of the rivet through the holes, being upset and substantially filling said second hole.

6. A trailer body, as defined in claim 5, wherein said first hole is located in said plate member portion.

7. A trailer body, as defined in claim 6, wherein said portion of the post member is about twice as thick as said portion of the plate member.

8. A trailer body, as defined in claim 7, wherein said plate member portion is between about 0.100 and 0.200 inch, and said portion of said post member is between about 0.200 and 0.400 inch thick.

9. A trailer body, as defined in claim 6, wherein said rivet head has a conical plate member portion engaging surface of an axial length greater than the thickness of said plate member portion.

10. A trailer body comprising an upstanding side, including a pair of upstanding side plate members having marginal portions of predetermined thickness and opposed edges, an upstanding post member having portions covering said edges of said plate members, said plate members having a series of holes punched through said portions thereof, said post member having a series of holes punched through said portions thereof, and respectively aligned with the holes in said plate members, and rivets respectively extending through aligned holes in said portions of said plate members and said post member, said rivets respectively including a head disposed in a first hole in said plate member portion, and a shank extending through a second aligned hole in the post member portion, said portion of the post member being about twice as thick as said portion of the plate member, said first hole having a swaged conical surface tapering inwardly toward the second hole with an included angle for causing material surrounding said first hole to be shaped during assembly of the rivet, said head intimately engaging and conforming to said swaged conical surface, said shank being upset and substantially filling said second hole, and said plate member portion having material extruded outwardly from around said first hole, so as to provide an increase in thickness around said first hole.

11. A method of making a trailer body comprising:
providing sides including a plurality of adjacent pairs of upstanding side plate members of predetermined thickness and having opposed edges, a plurality of side post members respectively covering said edges of adjacent pairs of plate members so that said plate members and said post members generally lie adjacent to each other, each of said plate members and post members having a first surface and a second surface;
punching a series of holes through said plate members and said post members so that said holes in said plate members initially have a first predetermined diameter at said first surface thereof and a second larger diameter at said second surface thereof, said holes in said post members initially having a diameter at said first surface thereof less than said second diameter of said plate members second surface, and a larger diameter at said second surface thereof;
providing rivets having shanks with diameters substantially the same as said initial first diameter of said plate members, each of said rivets including a head with a substantially frustoconical member-engaging surface having an included angle, and an end of each rivet opposite from said head;
inserting a rivet through said holes in said members for securing said members together by inserting the rivet first through the first surface of the plate members;
swaging surfaces of said holes in said plate members and said post members for closely conforming to said rivets during insertion of said rivets and causing said substantially frustoconical member-engaging surface to fill at least a portion of said holes substantially completely at a sheer plane between the members; and upsetting an end of each rivet opposite from said head to enlarge the end thereby enlarging the shank of the rivet to substantially completely filling at least a portion of said holes.

12. A method as defined in claim 11, further including the step of placing a thin shim member between the plate members and the post members before punching the holes.

13. A method as defined in claim 11, further including the step of swaging a first hole before assembling the rivet therethrough.

* * * * *